June 21, 1960    J. H. WERNIG    2,941,838
VEHICLE BODY DOOR UPPER FRAME SECTION
Filed April 24, 1959    2 Sheets-Sheet 1
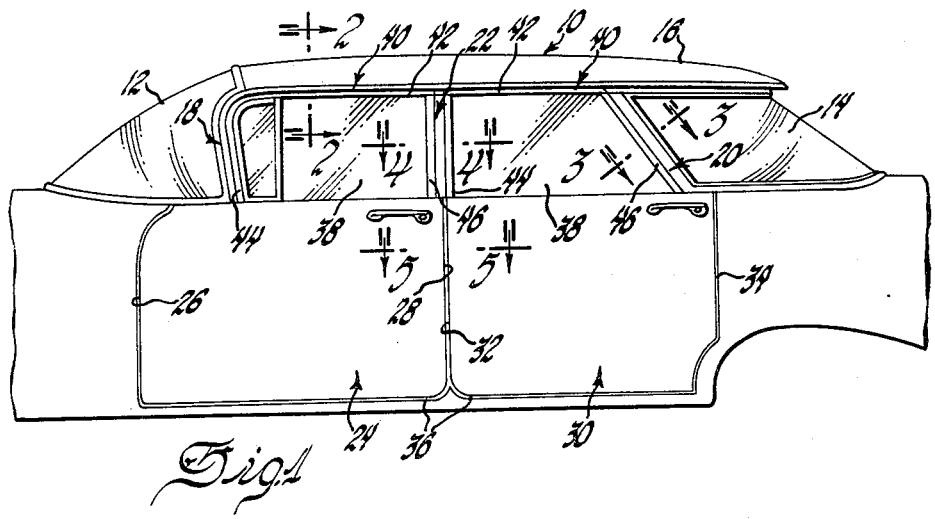
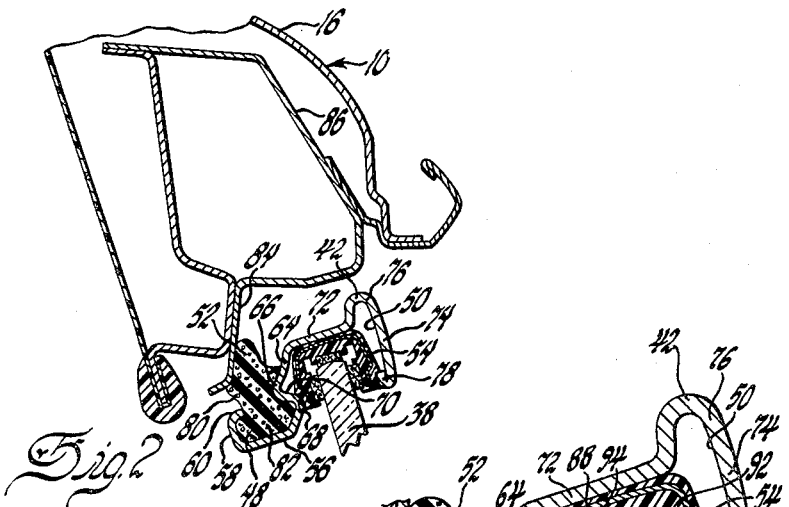
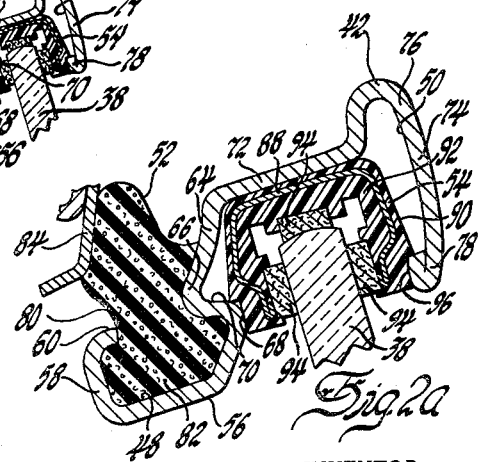
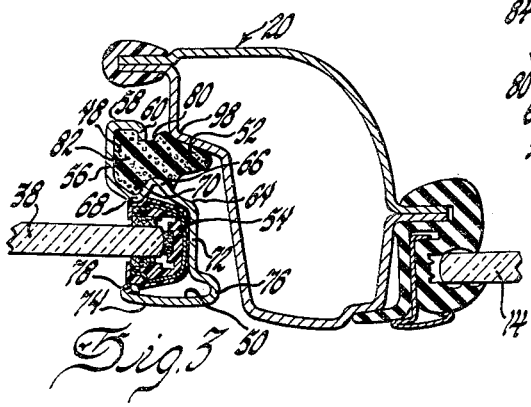
INVENTOR.
James H. Wernig
BY
Herbert Furman
ATTORNEY June 21, 1960 J. H. WERNIG 2,941,838
VEHICLE BODY DOOR UPPER FRAME SECTION
Filed April 24, 1959 2 Sheets-Sheet 2

INVENTOR.
James H. Wernig
BY
Herbert Furman
ATTORNEY

United States Patent Office 2,941,838
Patented June 21, 1960

2,941,838

VEHICLE BODY DOOR UPPER FRAME SECTION

James H. Wernig, Birmingham, Mich., assignor to General Motors Corporation, Detroit, Mich., a corporation of Delaware Filed Apr. 24, 1959, Ser. No. 808,686
8 Claims. (Cl. 296—44)

This invention relates to vehicle bodies and more particularly to vehicle body door structures.

This invention is concerned primarily with door structures of the general type having separate upper and lower door sections, and is particularly directed to providing a new and improved upper door section. The lower door section of such door structures generally comprises spaced door inner and outer panels joined by opposite end walls and a bottom wall to provide a window receiving well.

The upper door section of this invention is comprised of an integral single thickness rolled sheet metal member and includes a pair of oppositely opening side by side inboard and outboard mounting channels which respectively receive and mount a weatherstrip and a glass run channel. The mounting channels have a common inner wall which is provided with oppositely extending glass run channel and weatherstrip retaining ribs and the outer wall of each of the channels is provided with a complementary oppositely extending retaining rib. The weatherstrip and the glass run channel are each provided with oppositely opening grooves which receive the oppositely extending retaining ribs of their respective mounting channels so as to be retained therein on the upper door section. Thus, the upper door section of this invention is very economical and practical for use in automobile bodies since it can be made of strip material of the minimum possible width and yet will have high strength characteristics.

It will be understood, of course, that the upper door section is generally of a U-shape and that the opposite legs thereof extend within the lower door section below the belt line of the body so as to be secured to the opposite end walls thereof. The base wall of the outboard mounting channel provides the jamb face for the upper door section and is joined to the outer wall of the channel by an outer side rib which extends generally laterally to the base wall. In order to mount the upper door section on the end walls of the lower door section, the outer side rib is bent laterally into a continuation of the base wall below the belt line of the body so that both the base wall and the rib can be abutted against the end wall in face to face relationship and subsequently welded or otherwise secured thereto.

In the past, it has been common to use rolled upper door sections. However, none of these sections were of a single thickness metal construction throughout and none included any oppositely opening integral mounting channels having integral retaining means for both a door weatherstrip and a glass run channel. Accordingly, the upper door section of this invention has many distinct and unique advantages over such prior constructions.

The primary object of this invention is to provide an improved vehicle body door structure which includes a lower door section and an upper door section made of rolled sheet metal and having integral mounting channels which receive and mount therein a glass run channel and a door weatherstrip. Another object of this invention is to provide an improved vehicle body door structure which includes an upper door section made from single thickness rolled metal throughout and including oppositely opening integral inboard and outboard mounting channels respectively receiving the door weatherstrip and glass run channel and including integral retaining means cooperating with complementary retaining means on the weatherstrip and glass run channel so that both can be easily and quickly secured in place without any additional securing means being necessary.

These and other objects of this invention will be readily apparent from the following specification and drawings wherein:

Figure 1 is a partial side elevational view of a vehicle body having a door structure embodying this invention mounted thereon;

Figure 2 is an enlarged sectional view taken along the plane indicated generally by line 2—2 of Figure 1;

Figure 2a is an enlarged view of a portion of Figure 2.

Figure 3 is an enlarged sectional view taken generally along the plane indicated by line 3—3 of Figure 1;

Figure 4:
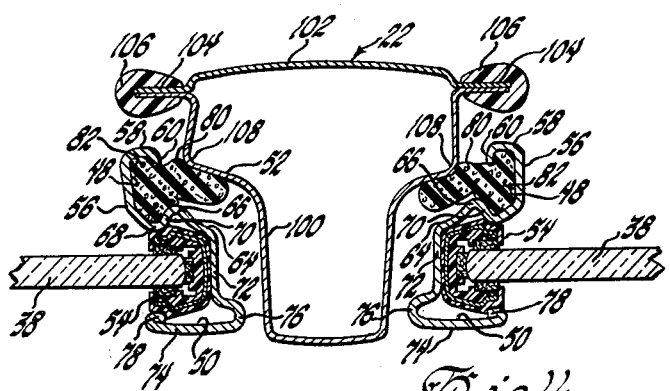
Figure 4 is an enlarged sectional view taken generally along the plane indicated by line 4—4 of Figure 1.

Referring now particularly to Figure 1 of the drawings a vehicle body 10 includes a windshield 12, a backlite 14, and a roof structure 16 supported on the body by front and rear pairs of windshield and backlite pillars 18 and 20, respectively. The roof structure 16 is further supported on the body by door pillar structures 22 located intermediate pillars 18 and 20 and extending between the roof structure 16 and the floor pan, not shown, of the body. A front door 24 is swingably mounted at its forward edge 26 on the body 10 and is latched at its rearward edge 28 to the pillar 22. The rear door 30 is swingably mounted at its forward edge 32 on the pillar 22 and is latched at its rearward edge 34 to the body. Both the front and rear doors are of like construction and each includes a lower door section 36 which comprises spaced inner and outer door panels joined by opposite end walls and a bottom wall to provide a window well for receiving the vertically moving door windows 38 when in open position. The doors further include an upper door section 40 which generally comprises an upper door window frame member 42 and front and rear door window frame members 44 and 46 respectively providing a generally U-shaped door window frame. As will be apparent from a further description, the front and rear members 44 and 46 extend within the window well and are secured to the front and rear end walls thereof so as to rigidly mount the upper door sections on the lower door sections. Since the lower door sections are of known construction, no further specific description thereof will be given other than that necessary to an understanding of the manner in which the upper door sections are mounted thereon.

Referring now to Figures 2 through 4 of the drawings, it will be generally noted that the upper door section is of single thickness rolled metal throughout and that the frame members 42, 44 and 46 are of like structure. Accordingly, like numerals will be used for like parts thereof.

Referring now particularly to Figure 2 of the drawings, the frame member 42 generally includes oppositely opening inboard and outboard mounting channels 48 and 50 respectively receiving and retaining the door weatherstrip 52 and a glass run channel 54. Channel 48 includes a base wall 56 joined to an integral laterally extending outer wall 58 which terminates in a laterally extending short flange 60 which provides one of the integral oppositely extending weatherstrip retaining ribs of channel 48 as will be further described. The inner wall 64 of channel 48 is common to both this channel and to channel 50 and is generally of an ogee shape to provide a pair of oppositely extending weatherstrip and glass run channel retaining ribs 66 and 68 respectively, each of which has a common wall or leg 70. Rib 66 is generally opposite to rib 60 and extends generally opposite thereto. The outer end of wall 64 is joined to the base wall 72 of channel 50 which provides the jamb face of the upper door section. The channel 50 further includes an outer wall 74 which extends generally laterally to the base wall 72 and is joined thereto by an outer side rib 76, the outer leg of which is generally coplanar with wall 74 and the inner leg of which extends generally laterally to the base wall 72. Wall 74 terminates at the inner edge thereof in a return bent flange 78 which is folded against the inner surface of wall 74 and provides a glass run channel retaining rib generally opposite to the rib 68 provided by the common inner wall 64 between the channels.

The weatherstrip 52 received within channel 48 includes a pair of oppositely opening grooves 80 in the lip portion thereof which receive ribs 60 and 66 respectively of channel 48 so as to retain the base portion 82 of the weatherstrip within the channel by engagement of the lower sides of the ribs with complementary shoulders on the base portion which define the lower sides of the grooves 80. As can be seen, the base portion of the weatherstrip fits snugly within the weatherstrip retaining channel 48 and conforms generally to the shape thereof. The weatherstrip 52 of the upper door window frame members 42 seal against a flange 84 of the side roof rails 86 of the body so as to seal the interior of the body against the entry of dust or dirt or other foreign matter.

The channel 50 receives the glass run channel 54, the details of which are clearly shown in Figure 2a of the drawings. Channel 54 includes a metal core channel 88 which is covered by outer and inner layers 90 and 92 respectively, of rubber. The inner layer 92 mounts longitudinally extending felt strips 94 on the base and side walls of the channel which bear against the edge portion of the window 38. The legs of the glass run channel are flexible and each includes a groove 96 for receiving the ribs 68 and 78 to retain the glass run channel within channel 50. The flexible legs of the glass run channel are bent toward each other in order that the glass run channel may be inserted within channel 50.

It will be understood, of course, that frame member 42 of the rear door upper section is of like construction.

Referring now particularly to Figure 3 of the drawings, the rear window frame member 46 of the rear door upper section is of like construction and accordingly like numerals have been used. However, in this area of the body the weatherstrip 52 abuts against the shoulder 98 of the backlite pillar 20 in order to seal the interior of the body.

Referring now particularly to Figure 4 of the drawings, it will be noted that the pillar 22 above the belt line of the body includes an outer channel shaped member 100 which is closed by an inner pillar member 102 joined to the outer pillar member by complementary laterally extending flanges 104 which are spot welded together to provide what is known as a pinch weld structure. The flanges 104 are covered by decorative plastic cap strips 106 which extend from the roof structure 16 of the body to the floor pan thereof. Since the rear window frame member 46 of the front door upper section and the forward window frame member 44 of the rear door upper section are of the same construction as the upper frame member 42, like numerals have been used for like parts and it is believed that no further description need be given other than to note that the weatherstrips 52 seal against the shoulders 108 of the channel 22 in this area of the body between the roof structure 16 thereof and the belt line of the body which is defined by the upper edges of the lower door sections 36 of doors 24 and 30.

Figure 5:
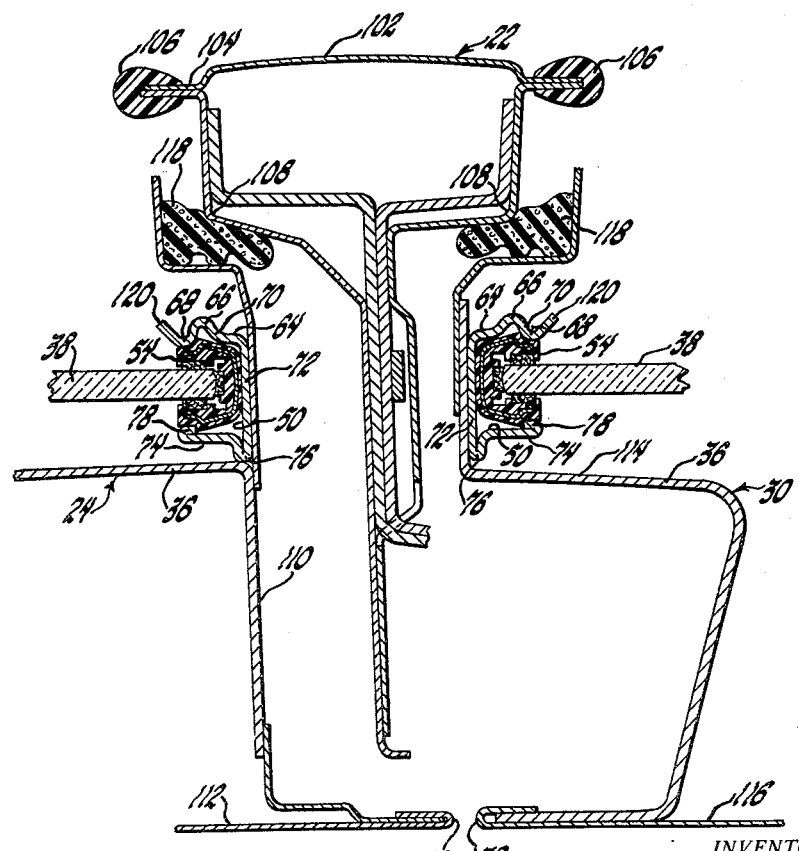
Figure 5 is an enlarged sectional view taken generally along the plane indicated by line 5—5 of Figure 1.

Referring now particularly to Figure 5 of the drawings, it will be remembered that the lower door sections 36 of the front and rear doors comprise spaced door inner and door outer panels joined by opposite end walls and a bottom wall to provide a window receiving well. Figure 5 shows a portion of the lower door sections to clearly show the rear end wall 110 of the front door 24 which is joined to the door outer panel 112 and the door inner panel, not shown, and to further show the forward end panel 114 of the rear door which is joined to the door outer panel 116 thereof and the door inner panel, not shown. Below the belt line of the body, the front and rear window frame members 44 and 46 of each upper section extend within the lower door sections and accordingly the interior of the body is sealed in this area by weatherstrips 118 which are mounted on the end walls 110 and 114 and which seal against the shoulders 108 of the pillar 22 from the belt line of the body to the floor pan thereof. Further, there is no need to provide any mounting means for the weatherstrips 52 below the belt line of the body and the inner wall 64 of the front and rear window frame members is accordingly cut at 120 so as to dispense with most of the channel 48 below the belt line of the body. However, since the glass run channels 54 in frame members 44 and 46 provide both a sealing and a guiding function for side edges of the door windows 38, it is desirable that these channels extend within the window wells of the lower door sections. Accordingly, channels 50 are continued below the belt line of the body within the door wells for this reason and also to provide a mounting means for the upper door section on the lower door section, which will now be described. The base walls 72 of channels 50 provide the mounting means and in order that the base walls abut the end walls 110 and 114 in a face to face relationship, the outer side ribs 76 of the frame members 44 and 46 are bent laterally through an arc of approximately 90° below the belt line of the body to a partially folded position wherein the inner legs thereof now provide a continuation of the base wall 72 of channel 50 and the outer legs thereof extend laterally with respect to the outer walls 74 of the channel. It is intended that the base walls 72 be secured to the end walls 110 and 114 in a suitable manner, such as by welding, to provide a rigid door structure. Although not shown in the drawings, it will be understood that the forward frame member 44 of the front door upper section and the rear window frame member 46 of the rear door upper section will be secured to the front end wall 114 and rear end wall 110 of the front and rear doors respectively, in substantially the same manner as has been described in conjunction with Figure 5.

Thus this invention provides a new and improved vehicle body door structure which includes separate upper and lower door sections with the upper door section being of rolled single thickness metal throughout and providing oppositely opening integral weatherstrip and glass run retaining channels having integral retaining means cooperable with complementary retaining means of the weatherstrip and the glass run channel so that these members can be easily and quickly mounted therein without requiring any additional mounting means.

I claim:

1. A vehicle body door structure comprising, a lower door section and an upper door window frame section providing a door window opening with said lower section, said upper section being formed of a rolled sheet metal member and including oppositely opening integral channels having generally parallel spaced base walls joined by a common inner wall, one of said channels opening to said window opening and including an outer wall extending laterally from the base wall thereof and terminating in a glass run channel retaining rib, said common inner wall including oppositely extending ribs providing a glass run channel retaining rib on said one of said channels located generally opposite to said retaining rib on said outer wall thereof and a weatherstrip retaining rib on the other of said channels, said other of said channels further including an outer wall extending laterally from the base wall thereof and terminating in a weatherstrip retaining rib located generally opposite to said weatherstrip retaining rib on the common inner wall between said channels.

2. A vehicle body door structure comprising, a lower door section and an upper door window frame section providing a door window opening with said lower section, said upper section being formed of a rolled sheet metal member and generally including oppositely opening integral channels having generally parallel spaced base walls joined by a common inner wall, one of said channels opening to said window opening and including an outer wall extending laterally from the base wall thereof and terminating in a glass run channel retaining rib, said common inner wall including oppositely extending adjacent ribs providing a glass run channel retaining rib on said one of said channels located generally opposite to said retaining rib on said outer wall thereof and a weatherstrip retaining rib on the other of said channels located between the adjacent glass run channel retaining rib and base wall of said other of said channels, said other of said channels further including an outer wall extending laterally from the base wall thereof and terminating in a weatherstrip retaining rib located generally opposite to said weatherstrip retaining rib on the common inner wall between said channels.

3. A vehicle body door structure comprising, a lower door section and an upper door window frame section providing a door window opening with said lower section, said upper section being formed of a rolled sheet metal member and generally including oppositely opening integral channels having generally parallel spaced base walls joined by a common inner wall, one of said channels opening to said window opening and including an outer wall extending laterally from the base wall thereof and terminating in a bent terminal flange providing a glass run channel retaining rib, said common inner wall including oppositely extending ribs providing a glass run channel retaining rib on said one of said channels located generally opposite to said retaining rib on said outer wall thereof and a weatherstrip retaining rib on the other of said channels, said other of said channels further including an outer wall extending laterally from the base wall thereof and terminating in a bent terminal flange providing a weatherstrip retaining rib located generally opposite to said weatherstrip retaining rib on the common inner wall between said channels.

4. A vehicle body door structure comprising, a lower door section and an upper door window frame section providing a door window opening with said lower section, said upper section being formed of a rolled sheet metal member and generally including oppositely opening integral inboard and outboard channels having generally parallel spaced base walls joined by a common inner wall, said outboard channel opening to said window opening and including a laterally extending outer wall terminating in a glass run channel retaining rib and being joined to said base wall by a laterally extending outer side rib opening to said channel, said common inner wall including oppositely extending ribs providing a glass run channel retaining rib on said outboard channel located generally opposite to said retaining rib on said outer wall thereof and a weatherstrip retaining rib on said inboard channel, said inboard channel including an outer wall extending laterally to the base wall thereof terminating in a weatherstrip retaining rib located generally opposite to said weatherstrip retaining rib on the common inner wall between said channels.

5. A vehicle body door structure comprising, a lower door section and an upper door window frame section providing a door window opening with said lower section, said upper section being formed of a rolled sheet metal member and generally including oppositely opening integral inboard and outboard channels having generally parallel spaced base walls joined by a common inner wall, said outboard channel opening to said window opening with the base wall thereof providing a door jamb face, an outer wall extending laterally from said base wall of said outboard channel and terminating in a bent flange extending inwardly of said channel and providing a glass run channel retaining rib, said common inner wall being generally of ogee shape to provide a glass run channel retaining rib on said outboard channel located generally opposite to said retaining rib on said outer wall thereof and a weatherstrip retaining rib on said inboard channel, said inboard channel including an outer wall extending laterally to the base wall thereof and terminating in a bent flange extending inwardly of said channel to provide a weatherstrip retaining rib located generally opposite to said weatherstrip retaining rib on the common inner wall between said inboard and outboard channels.

6. A vehicle body door structure comprising, a lower door section and an upper door window frame section providing a door window opening with said lower section, said upper section being formed of a rolled sheet metal member and generally including oppositely opening integral inboard and outboard channels having generally parallel spaced base walls joined by a common inner wall, said outboard channel opening to said window opening with the base wall thereof providing a door jamb face, an outer wall extending laterally from said base wall of said outboard channel and terminating in a flange bent inwardly of said channel and providing a glass run channel retaining rib, said common inner wall being generally of ogee shape to provide a glass run channel retaining rib on said outboard channel located generally opposite to said retaining rib on said outer wall thereof and a weatherstrip retaining rib located adjacent to said glass run channel retaining rib thereon between said retaining rib and the base wall of said inboard channel, said inboard channel further including an outer wall extending laterally to the base wall thereof and terminating in a flange bent inwardly of said channel to provide a weatherstrip retaining rib located generally opposite to said weatherstrip retaining rib on the common inner wall between said inboard and outboard channels.

7. A vehicle body door structure comprising, a lower door section and an upper door window frame section providing a door window opening with said lower section, said upper section being formed of a rolled sheet metal member and generally including oppositely opening integral inboard and outboard channels having generally parallel spaced base walls joined by a common inner wall, said outboard channel opening to said window opening with the base wall thereof providing a door jamb face, an outer wall extending laterally from said base wall of said outboard channel and terminating in an inwardly return bent flange folded against said outer wall to provide a glass run channel retaining rib, said common inner wall being generally of ogee shape to provide a glass run channel retaining rib on said outboard channel located generally opposite to said retaining rib on said outer wall thereof and a weatherstrip retaining rib located adjacent to said glass run channel retaining rib thereon between said retaining rib and the base wall of said inboard channel, said inboard channel further including an outer wall extending laterally from the base wall thereof and being shorter than said common inner wall, said outer wall of said inboard channel terminating in a laterally extending terminal flange extending inwardly of said channel, the edge of which provides a weatherstrip retaining rib located generally opposite to said weatherstrip retaining rib on the common inner wall between said inboard and outboard channels.

8. A vehicle body door structure comprising, a lower door section having spaced inner walls joined by end walls, an upper door window frame section providing a door window opening with said lower section, said upper section being formed of a rolled sheet metal member and generally including oppositely opening integral channels having generally parallel spaced base walls joined by a common inner wall, one of said channels opening to said window opening and including an outer laterally extending wall terminating in a glass run channel retaining rib and being joined to said base wall by an outer side rib extending laterally to the base wall thereof, said common inner wall including oppositely extending ribs providing a glass run channel retaining rib on said one of said channels located generally opposite to said retaining rib on said outer wall thereof and a weatherstrip retaining rib on the other of said channels, said other of said channels further including an outer laterally extending wall terminating in a weatherstrip retaining rib located generally opposite to said weatherstrip retaining rib on the common inner wall between said channels, said upper section extending within said lower section with said base wall of said one of said channels being abutted against one of said end walls, said outer side rib being bent laterally to said outer wall of said one of said channels into continuation of said base wall thereof to allow said base wall to abut said one of said end walls in face to face relationship.

No references cited.